United States Patent [19]

Miura et al.

[11] Patent Number: 4,711,138
[45] Date of Patent: Dec. 8, 1987

[54] AUTOMATIC TRANSMISSION MECHANISM

[75] Inventors: Masakatsu Miura, Kariya; Hideyuki Aoki, Anjo, both of Japan

[73] Assignee: Aisin-Warner Kabushiki Kaisha, Aichi, Japan

[21] Appl. No.: 833,377

[22] Filed: Feb. 26, 1986

[30] Foreign Application Priority Data

Oct. 16, 1985 [JP] Japan ................................ 60-230809
Dec. 16, 1985 [JP] Japan ................................ 60-282584

[51] Int. Cl.$^4$ ........................ F16H 57/10; F16D 25/10
[52] U.S. Cl. ........................................ 74/761; 74/767; 192/87.11; 192/87.16
[58] Field of Search ................. 74/760, 761, 767, 695, 74/606 R, 753, 701, 688, 682; 192/87.1, 87.11, 87.12-87.19

[56] References Cited

U.S. PATENT DOCUMENTS

| | | | |
|---|---|---|---|
| 3,279,573 | 10/1966 | Hensel | 192/87.11 |
| 3,355,966 | 12/1967 | Boehm | 74/688 |
| 3,359,827 | 12/1967 | Chapman et al. | 74/688 X |
| 3,365,985 | 1/1968 | Johnson | 74/761 |
| 3,747,727 | 7/1973 | Dach et al. | 192/87.11 X |
| 3,747,730 | 7/1973 | Hause | 192/87.11 |
| 4,229,996 | 10/1980 | Hildebrand | 74/688 |
| 4,592,250 | 6/1986 | Plasencia et al. | 74/688 |

FOREIGN PATENT DOCUMENTS

| | | |
|---|---|---|
| 0041730 | 12/1981 | European Pat. Off. . |
| 966355 | 8/1964 | United Kingdom ............. 192/87.11 |
| 1108631 | 4/1968 | United Kingdom . |
| 1256988 | 12/1971 | United Kingdom . |
| 1445515 | 8/1976 | United Kingdom . |
| 1525593 | 9/1978 | United Kingdom . |
| 2030246 | 4/1980 | United Kingdom . |
| 2132289 | 7/1984 | United Kingdom ................. 74/695 |

Primary Examiner—Leslie Braun
Assistant Examiner—Joseph M. Rolnicki
Attorney, Agent, or Firm—Wenderoth, Lind & Ponack

[57] ABSTRACT

Sun gears of a single planetary gear unit and a dual planetary gear unit are connected with respect to each other, carriers of the respective gear units in the connected state are connected to an output member, an input member is connected to a ring gear of the single planetary gear unit through a first clutch, to a sun gear through a second clutch and also to a ring gear of the dual planetary gear unit through a third clutch, and the sun gear and a ring gear of the dual planetary gear unit are stoppable by retaining means. When in forward travelling, the ring gear of the single or dual planetary gear unit is inputted with torque from the input member based on connection of the first and/or third clutch.

7 Claims, 12 Drawing Figures

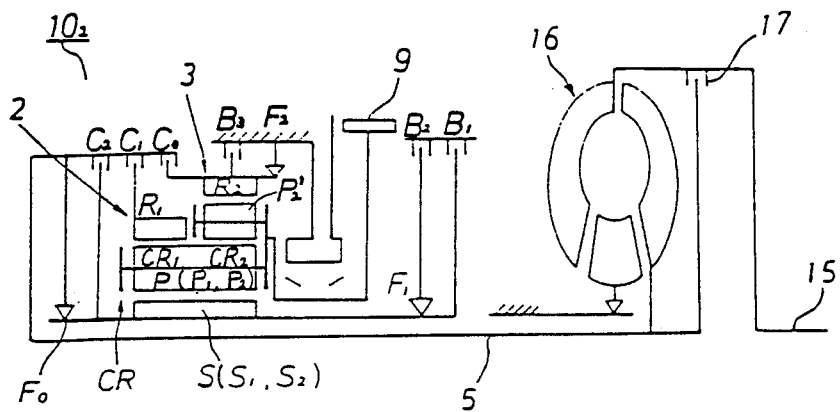

FIG. 5

| | | 3 speed A/T part 10₁ | | | | | | annexed transmission part 20₂ | | |
|---|---|---|---|---|---|---|---|---|---|---|
| | | $C_1$ | $C_2$ | $B_1$ | $B_2$ | $B_3$ | $F_1$ | $F_2$ | $C_3$ | $B_4$ | $F_3$ |
| P | | | | | | | | | | O | |
| R | | | O | | O | | | | | O | |
| N | | | | | | | | | | O | |
| D | 1 | O | | | | | O | | | O | O |
| D | 2 | O | | | O | | O | | | O | O |
| D | 3 | O | | | O | | O | | O | | |
| D | 4 | ⊙ | O | | ⊙ | | | | O | | |
| 3 | 1 | O | | | | | O | | | O | O |
| 3 | 2 | O | | | O | | O | | | O | O |
| 3 | 3 | O | O | | ⊙ | | | | | O | O |
| 2 | 1 | O | | | | | O | | | O | O |
| 2 | 2 | O | | O | O | | O | | | O | O |
| 1 | 1 | O | | | | O | | O | | O | O |

4 speed

FIG. 9

5 speed

| | | 4 speed A/T part 10₂ | | | | | | | | annexed transmission part 20₂ | | |
|---|---|---|---|---|---|---|---|---|---|---|---|---|
| | | $C_1$ | $C_2$ | $C_0$ | $B_1$ | $B_2$ | $B_3$ | $F_1$ | $F_2$ | $F_0$ | $C_3$ | $B_4$ | $F_3$ |
| P | | | | | | | | | | | | ○ | |
| R | | | ○ | | | | ○ | | | | | ○ | |
| N | | | | | | | | | | | | ○ | |
| D | 1 | ○ | | | | | | ○ | | | | ○ | ○ |
| D | 2 | ○ | | | | ○ | | ○ | | | | ○ | ○ |
| D | 3 | ○ | | | | ○ | | ○ | | | ○ | | |
| D | 4 | ○ | | ○ | | (○) | | | | ● | ○ | | |
| D | 5 | | | ○ | ○ | (○) | | | (○) | | ○ | | |
| 4 | 1 | ○ | | | | | | ○ | | | | ○ | ○ |
| 4 | 2 | ○ | | | | ○ | | ○ | | | | ○ | ○ |
| 4 | 3 | ○ | | ○ | | (○) | | | | ● | ○ | ○ | |
| 4 | 4 | ○ | | ○ | | (○) | | | | ● | ○ | | |
| 2 | 1 | ○ | | | | | | ○ | | | | ○ | ○ |
| 2 | 2 | ○ | | | ○ | ○ | | ○ | | | | ○ | ○ |
| 1 | 1 | ○ | | | | | ○ | | ○ | | | ○ | ○ |

FIG.10

6 speed

| | | 4 speed A/T part 10₂ | | | | | | | | annexed transmission part 20₂ | | |
|---|---|---|---|---|---|---|---|---|---|---|---|---|
| | | C₁ | C₂ | C₀ | B₁ | B₂ | B₃ | F₁ | F₂ | F₀ | C₃ | B₄ | F₃ |
| | P | | | | | | | | | | O | | |
| | R | | O | | | O | | | | | O | | |
| | N | | | | | | | | | | O | | |
| D | 1 | O | | | | | | | O | | O | O |
| | 2 | O | | | | | | | O | | O | |
| | 3 | O | | | | O | | O | | | O | O |
| | 4 | O | | | | O | | O | | | O | |
| | 5 | O | | O | | ⊙ | | | | ⦿ | O | |
| | 6 | | O | O | | ⊙ | | | ⊙ | | O | |
| 5 | 1 | O | | | | | | | O | | O | O |
| | 2 | O | | | | | | | O | | O | |
| | 3 | O | | | | O | | O | | | O | O |
| | 4 | O | | O | | ⊙ | | | | ⦿ | O | O |
| | 5 | O | | O | | ⊙ | | | | ⦿ | O | |
| 2 | 1 | O | | | | | | | O | | O | O |
| | 2 | O | | | | O | | | O | | O | |
| 1 | 1 | O | | | | O | | O | | | O | O |

|     | C₁ | C₂ | C₀ | B₁ | B₂ | B₃ | F₁ | F₂ | F₀ |
|-----|----|----|----|----|----|----|----|----|----|
| 1ST | ○  |    |    |    |    | △  |    | ○  |    |
| 2ND | ○  |    |    | △  | ○  |    | ○  |    |    |
| 3RD | ○  |    | ○  |    | ○  |    |    |    | ⊙  |
| 4TH |    |    | ○  | ○  | ○  |    |    |    |    |
| REV |    | ○  |    |    |    | ○  |    |    |    |

PRIOR ART

AUTOMATIC TRANSMISSION MECHANISM

BACKGROUND OF THE INVENTION

1. Field of the Invention

This invention relates to an automatic transmission, particularly to an automatic transmission for an automobile which is used together with a torque converter, and more particularly to an automatic transmission mechanism which achieves four forward speeds by the use of two planetary gear units.

2. Description of the Related Art

Generally, an automatic transmission is formed of the so-called Simpson type including two single planetary gear units, a sun gear of both planetary units being commonly used and a carrier of the first planetary gear unit being integrally connected to a ring gear of the second planetary gear unit. In this type of conventional transmission, the four forward speeds are achieved as follows. That is, the driving force is selectively inputted by the ring gear of the first planetary gear unit and/or sun gear through a clutch, the predetermined rotational members of the planetary gear units are retained by a brake or a one-way clutch, and the driving force is outputted from the ring gear of the second planetary gear unit integrally connected to the carrier of the first planetary gear unit.

A conventional four speed automatic transmission employs the aforementioned three speed automatic transmission including two planetary gear units as a base, and additionally employs an overdrive (O/D) mechanism attached thereto and or underdrive (U/D) mechanism comprising a planetary gear unit in order to obtain a gear change stage for obtaining the four forward speeds.

In recent years, in view of the ever growing demand for F F (front engine front drive), high horse power, etc. in vehicles for example, the automatic transmission is required to be made much smaller. In addition, the transmitting torque capacity is required to be made larger. However, a four speed automatic transmission mentioned above with three planetary gear units including an additionally attached O/D mechanism etc. can't meet the demands mentioned above.

Under the circumstances, there is proposed an automatic transmission mechanism in which two clutches are additionally attached to the conventional so-called Simpson type planetary gear unit for obtaining four speeds in Japanese Laid-open Patent Application No. 59(1984)-183147. That is, the mechanism of the automatic transmission has a third clutch that is disposed between the sun gear of the first planetary gear unit and the sun gear of the second planetary gear unit integrally connected with respect to each other in the conventional Simpson type, at the same time, the sun gear of the first gear unit communicates with the carrier of the second gear unit through a fourth clutch, the third clutch is disengaged to separate the first gear unit from the second gear unit, the fourth clutch is connected in order to transfer an input to the carrier of the second gear unit, and at the same time, the sun gear of the second gear unit is fixed, in order to output an overdrive from the ring gear to obtain a fourth speed in addition to the three speeds.

However, since both the planetary gear units are separated by a clutch in the improved Simpson type automatic transmission, it is difficult to dispose both the planetary gear units in the integrated state. Moreover, it is difficult to dispose many clutches together at one place. Accordingly, in order to modify the conventional Simpson type three speed automatic transmission mechanism to a four speed automatic mechanism by additionally attaching third and fourth clutches thereto, an extremely large modification is required, and the three speed automatic transmission mechanism and four speed automatic transmission mechanism have to be manufactured separately. Due to the foregoing, common use of parts and a assembly line are difficult to attain, and a small production of many kinds of parts often invite a significant increase in cost, thus inhibiting the requirements of recent time tendency of various kinds of vehicles and wide variations thereof.

On the other hand, attention is paid to the so-called Ravigneaux type automatic transmission mechanism, wherein two units of carriers are integrally formed and which is expected to be made much smaller.

The Ravigneaux type automatic transmission mechanism 1, as shown in FIG. 11, comprises a single planetary gear unit 2' and a dual planetary gear unit 3'. An input member I is connected to a sun gear $S_2$ of the dual unit 3' through a clutch $C_1$, and also to a sun gear $S_1$ of the single unit 2' through a clutch $C_2$ or a one-way clutch $F_o$. The input member I is further connected to a carrier $CR_2$ supporting dual pinions $P_2$, $P'_2$ and to a first carrier $CR_1$ which is integrally connected to the second carrier $CR_2$, through a clutch $C_o$. An output member O is connected to ring gears $R_1$ and $R_2$ of both the units 2' and 3' which are connected with each other and are integrally rotated.

The Ravigneaux type automatic transmission, as shown by an operation table of FIG. 12, offers one speed through four speed (1st through 4th) and reverse (Rev) according to actuation of the respective clutches $C_1$, $C_2$ and $C_o$, the respective brakes $B_1$, $B_2$ and $B_3$ and the respective one-way clutches $F_1$, $F_2$ and $F_o$. In the figure, ○ denotes coupling of clutches and actuation of brakes and one-way clutches, △ denotes the actuation during only coast time, and ● denotes actuation only when gears are shifted and thereafter synchronous rotation is effected.

However, in the Ravigneaux type automatic transmission mechanism, since engine torque is input to the sun gear $S_2$ ($S_1$), the tangential force acting on the sun gear with a smaller diameter is high and particularly this force significantly appears first speed at which the transmitting torque is large. On the other hand, there are problems of the durability of the gear face of the sun gear $S_2$ not being satisfactory. Also, the durability of a brake $B_3$ and one-way clutch $F_2$ which often receive the reaction force of the carriers $CR_1$ and $CR_2$ is problematical. Because of the foregoing, allowable input torque is limited, thus not meeting the recent time for high horse power. Any attempt to make the allowable input torque larger results in a need for thickening the gear width of the sun gear. Furthermore, tolerance of retaining means such as brakes, etc. is required to be made large which again results in a large size of an automatic transmission, and problems arising in respect to loading them on vehicles.

SUMMARY OF THE INVENTION

It is therefore an object of the present invention to provide an automatic transmission mechanism which can be made small while maintaining a predetermined allowable input torque by inputting torque from an input member to a ring gear of a planetary gear unit, and wherein most of the parts thereof are commonly used so that the mechanism can be modified to a forward four speed mechanism from forward three speed mechanism with a minor change.

That is, the present invention comprises sun gears of a single planetary gear unit and a dual planetary gear unit that are connected with each other, carriers of both the planetary gear units in the connected state being connected to an output member, an input member connected to a ring gear of the single planetary gear unit through a first clutch, to the sun gear through a second clutch and also to a ring gear of the dual planetary gear unit through a third clutch, the sun gears and a ring gear of the dual planetary gear unit being stoppable by retaining means, and when travelling forward, torque from the input member being input to the ring gear of the single or the dual planetary gear unit based on a connection of thereof through the first and/or third clutch.

According to the present invention, although it employs a system for making the mechanism small by integrally connecting the carriers of the respective planetary gear units with respect to each other, the allowable input torque can be made large with the tangential force acted on the gear face being small and without making the gear width thick and the tolerance of the retaining means large, since torque from the input member is normally input to the ring gear except in reverse, thus enabling recent time demands for high horse power to be met. Since the carriers are integrally connected with each other and the sun gears are also integrally connected, the mechanism of the present invention is compact, thus enabling a limited installation space due to F F, etc. do be coped with and overcoming the problems with respect to installation in vehicles. Furthermore, transmission mechanism can be modified to a four speed automatic transmission mechanism from a three speed automatic transmission mechanism with a simple addition of the third clutch $C_o$ (and the third one-way clutch $F_o$), and manufacturing equipment and parts can be commonly used. Thus, the present invention enables many kinds and small quantities if parts to be produced which is required when producing many kinds of vehicles without increasing the cost.

Furthermore, by the use of three clutches $C_1$, $C_2$ and $C_o$ and retaining means, and more particularly, of three brakes $B_1$, $B_2$, and $B_3$, and three one-way clutches $F_1$, $F_2$ and $F_o$, a four speed automatic transmission mechanism $10_2$ can be achieved and a compact multispeed automatic transmission with a correct gear ratio can be obtained.

BRIEF DESCRIPTION OF THE DRAWINGS

FIG. 1 is a schematic view showing one example of a four speed automatic transmission mechanism according to the present invention;

FIG. 2 is an illustration showing the actuating state of the respective elements thereof;

FIG. 5 is an illustration showing the actuating state of the respective elements thereof;

FIG. 9 and FIG. 10 are illustrations showing the actuating state of the respective elements in different operation modes of the transmission of FIG. 6;

DESCRIPTION OF THE PREFERRED EMBODIMENT

Figure 3:
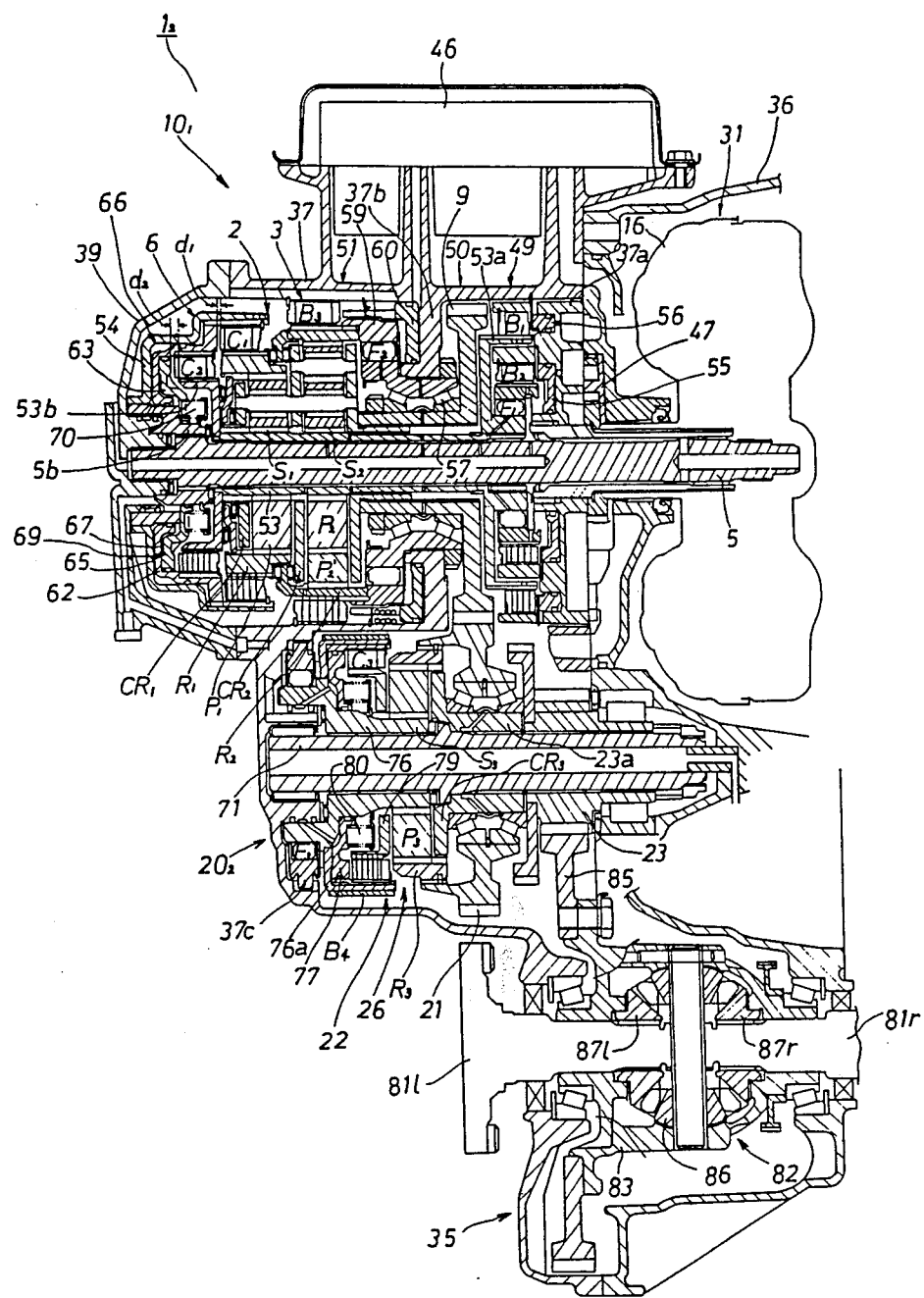
FIG. 3 is an overall sectional view showing a three speed automatic transmission which is a base mechanism of the present invention.

A four speed transmission mechanism $10_2$, as shown in FIG. 1, includes a single planetary gear unit 2 and a dual planetary gear unit 3. Carriers CR ($CR_1$ and $CR_2$) of both the planetary gear units 2 and 3 are integrally connected with respect to each other. Similarly, sun gears S ($S_1$ and $S_2$) of both the planetary gear units 2 and 3 are connected with each other. An input member 5 connected from an engine output shaft 15 through a torque converter 16 or a lock-up clutch 17 is connected to a ring gear $R_1$ of the single planetary gear unit 2 through a first clutch $C_1$ and also to the sun gears S through a second clutch $C_2$. The sun gear S is directly braked by the first brake $B_1$ and restricted to unidirectional rotation by the second brake $B_2$ through a one-way clutch $F_1$. The ring gear $R_2$ of the dual planetary gear unit 3 is directly braked by the third brake $B_3$ and is restricted to unidirectional rotation by a second one-way clutch $F_2$.

In addition, an input member 5 is connected to the ring gear $R_2$ of the dual planetary gear 3 through the third clutch $C_o$. Interposed between the input member 5 and the sun gear S is a third one-way clutch $F_o$ for restricting rotation of the sun gear S in order that it not exceed the rotation of the input member 5.

With the above constitution, the four speed automatic transmission mechanism $10_2$ is operated according to the operation table shown in FIG. 2. That is, in the first speed state of D range, the first (forward) clutch $C_1$ is connected. Then, rotation of the input member (shaft) 5 is transmitted to the ring gear $R_1$ of the single unit 2 through the clutch $C_1$. Since the ring gear $R_2$ of the dual unit 3 is prevented from rotating by the second one-way clutch $F_2$ in the foregoing state, the common carrier CR is rotated in the normal direction at an extensively reduced speed while causing the sun gear S to rotate idly in the reverse direction, and rotation is taken off of the output member (gear) 9. In the second speed state, the second brake $B_2$ is actuated in addition to the connection of the first clutch $C_1$. Then, the sun gear S is stopped from rotating due to actuation of the first one-way clutch $F_1$ according to the brake $B_2$. Accordingly, rotation of the ring $R_1$ from the input member 5 causes the carrier CR to rotate in the normal direction at a reduced speed while causing the ring gear $R_2$ of the dual unit 3 to rotate idly in the normal direction, and rotation is taken off, as a second speed, of the output member 9. In the third speed state, the third clutch $C_o$ (or second clutch $C_2$) is connected in addition to the connection of the first (forward) clutch $C_1$. Then, rotation of the input member 5 is transmitted to the ring gear $R_1$ of the single unit 2 through the clutch $C_1$ and also to the ring gear $R_2$ of the dual unit 3 through the clutch $C_o$. Accordingly, the respective elements of both the planetary gear units 2 and 3 are integrally rotated and the same speed rotation as that of the input member 5 is transmitted to the output member 9 from the carrier CR. At this time, the second brake $B_2$ maintains its retaining state until the clutch $C_o$ is connected in order to prevent it from temporarily returning to the first speed state from speed. In the state that the clutch $C_o$ is completely connected and the planetary units 12 and 13 are integrally rotated, the third one-way clutch $F_o$ is synchronously rotated. And, in the fourth speed state, the clutch $C_1$ is disengaged and the first brake $B_1$ is actuated. Then, rotation of the input member 5 is transmitted to the ring gear $R_2$ of the dual unit 13 through the clutch $C_o$. Since the sun gear S is stopped in the foregoing state, the carrier CR is rotated at a high speed while causing the ring gear $R_1$ of the single unit 12 to rotate idly at an increased speed and the high speed rotation is taken off, as an overdrive (O/D) of the output member 9. When up-shifting from third speed to fourth speed, a sufficient time is allowed for the retaining operation of the first brake $B_1$ to occur, operation timing can be taken easily, and a smooth shift can be obtained by preventing a possible shift shock due to a change of grasping because the first clutch $C_1$ is disengaged prior to actuation of the first brake $B_1$ and acceleration of the sun gear S is prevented by the third one-way clutch $F_o$. At this time, the second brake $B_2$ and the first one-way clutch $F_1$ may be engaged. Similarly, in down-shifting from fourth speed to third speed, because of the presence of the third one-way clutch $F_o$, the sun gear S is prevented from being rotated at a higher speed than the input member 5, due to the release of the first brake $B_1$ in order to allow sufficient time for connection of the first clutch $C_1$, to make operation timing easy and to prevent a possible shift shock due to a change of grasping to obtain a smooth shift. Operation in the 3 range is the same for obtaining first speed, second speed and third speed as in the D range.

In the reverse (R) range, the second clutch $C_2$ and the third (1st reverse) brake $B_3$ are actuated. Then, rotation of the input member 5 is transmitted to the sun gear S through the clutch $C_2$. Since the ring gear $R_2$ of the dual unit 3 is fixed due to actuation of the third brake $B_3$ in the foregoing state, the carrier CR is also rotated in reverse while causing the ring gear $R_1$ of the single unit 2 to rotate in reverse way, and the reverse rotation of the carrier is taken off of the input member 9. In the 1 range, the third brake $B_3$ is actuated in addition to the operation for obtaining the first speed state in the D range. Accordingly, when an engine brake is effected (when the input and output are reversed), transmission is cut off by the one-way clutch $F_2$ and an idle rotation is created in the D range. However, since the ring gear $R_2$ is maintained in its fixed state by the brake $B_3$ in the 1 range, the first speed state can be maintained. The first speed in 2 range is obtained in the same way as is first speed in the D range. In second speed, the first (2nd coast) brake $B_1$ is actuated in addition to the second speed state in the D range. Then, when an engine brake is effected, although an idle rotation state is created by the one-way clutch $F_1$ in the D range, the sun gear S is maintained in its fixed state by the brake $B_1$ in the 2 range and the second speed state is maintained.

A more specific embodiment of the present invention will be described.

Before describing the embodiment of the present invention, there will be described an automatic transmission including a three speed transmission mechanism which is used as a base mechanism of the present invention.

An automatic transmission $1_2$ including a three speed automatic transmission mechanism portion $10_1$, as shown in FIG. 3, includes a torque converter portion 31, a three speed automatic transmission mechanism portion $10_1$, an annexed transmission part $20_2$, and a differential portion 35. These respective portions rest in a trans-axle housing 36, a trans-axle case 37 and a trans-axle cover 39 which are attached with respect to one another and integrally formed with respect to one another. The converter portion 31 comprises a torque converter 16 and a lock-up clutch 17 (see FIG. 4) and is adapted to transmit torque from a shaft 15 connected to an engine crank shaft to an input shaft 5 disposed within the automatic transmission mechanism portion $10_1$ through oil flow within the torque converter 16 or through the coupling of the lock-up clutch 17. Disposed at an upper portion of the trans-axle case 37 is a valve body 46. Disposed at an intermediate portion between the automatic transmission mechanism portion $10_1$ and the torque converter portion 31 is an oil pump 47.

Figure 4:
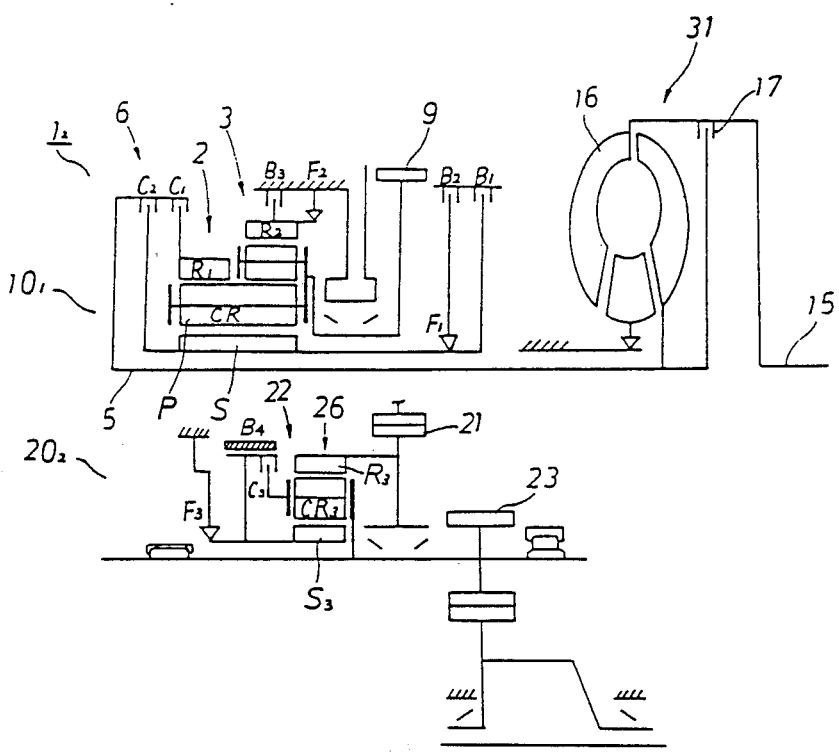
FIG. 4 is a schematic view thereof.

The three speed automatic transmission mechanism portion $10_1$ is provided with a brake portion 49, an output portion 50, a planetary gear unit portion 51 and a clutch portion 6 arranged in this order in an axial direction from an engine output portion toward the outside. A hollow shaft 53 is rotatably supported by the input shaft 5. The planetary gear unit portion 51 comprises a single gear unit 2 and a dual gear unit 3. The single gear unit 2 comprises a sun gear $S_1$ formed on a hollow shaft 53, a ring gear $R_1$ and a carrier $CR_1$ supporting a pinion $P_1$ meshed with these gears. The dual unit 3 comprises a sun gear $S_2$ formed on the hollow shaft 53, a ring gear $R_2$, a carrier $CR_2$ carrying a first pinion $P_2$ meshed with the sun gear $S_2$ and a pinion $P_2'$ meshed with the ring gear $R_2$ in such a manner so as to be meshed with respect each other. And, the sun gears $S_1$ and $S_2$ (hereinafter simply referred to as S) of both the units 2 and 3 are formed of gears having the same number of teeth and are formed on the hollow shaft 53. The carriers $CR_1$ and $CR_2$ (hereinafter simply referred to as CR) are integrally formed of three sheets of side board. In this embodiment, separate pinions $P_1$ and $P_2$ are employed. Alternatively, an integral long pinion P may be employed as shown in FIG. 4. Furthermore, both the sun gears $S_1$ and $S_2$ may be commonly used. The brake portion 49 is provided with a first one-way clutch $F_1$, a second brake $B_2$ and a first brake $B_1$ arranged in this order from the inner diameter side thereof toward the outer diameter side thereof. Disposed at a position adjacent to the respective brakes are hydraulic actuators 55 and 56 formed on a case of the oil pump 47 and arranged parallel with respect to each other in the radial direction. The first brake $B_1$ is interposed between a flange portion 53a attached to the front end of the hollow shaft 53 and a pump case 37a integrally formed with the axle case 37. The second brake $B_2$ is interposed between an outer race of the first one-way clutch $F_1$ and the pump case 37a. The first one-way clutch $F_1$ is interposed between the hollow shaft 53 and the second brake $B_2$.

On the other hand, the output portion 50 is disposed at a generally central portion of the transmission mechanism portion $10_1$ and includes an output member 9 having an output (counter drive) gear. The output member 9 is supported at the outer diameter of its boss portion by a partition wall 37b integrally formed on the axle case 37 through a bearing 57 in such a manner so as to be rotatable but unmovable in the axial direction. The bearing 57 comprises a double tapered roller bearing including an outer race and two inner races with a spacer ring interposed therebetween, the outer race having a splined connection with the partition wall 37b. The outer race includes a stepped portion and extends in the axial direction. The extended portion is also serves as the inner race of the second one-way clutch $F_2$. A connecting member 59 is in spline connection with the ring gear $R_2$ of the dual unit 3 and extends in the axial direction to serve as the outer race of the one-way clutch. Interposed between both the races is the second one-way clutch $F_2$. Accordingly, the one-way clutch $F_2$ is disposed between the planetary gear unit 3 and the case partition wall 37b in parallel relation in the axial direction and at a generally inner position of the ring gear $R_2$ of the unit 3. Interposed between the outer periphery of the ring gear $R_2$ and the axle case 37 is a third brake $B_3$. The partition wall 37b is formed at one side wall surface portion thereof with a cylinder. The cylinder is provided with a hydraulic actuator 60 comprising a piston sandwiched between the second one-way clutch $F_2$ and itself. The hydraulic actuator 60 includes an arm formed in the shape of a cylindrical comb tooth. The arm extends in the axial direction along the outer diameter side of the second one-way clutch $F_2$ to control the third brake $B_3$. The comb tooth portion thereof is provided with a return spring.

The clutch portion 6 includes a first (forward) clutch $C_1$ and a second (direct) clutch $C_2$. These are located at the front end of the automatic transmission mechanism portion $10_1$ and rest in the trans-axle cover 39 portion. The input shaft 5 is integrally connected at its front end portion with the flange portion 54. The flange portion 54 is engaged with a movable member 62. The movable member 62 is engaged with a piston member 63. The movable member 62 defines an oil chamber 65 between its inner diameter portion and the cylinder formed of the internal peripheral surface by the flange portion 54, and the outer diameter portion is connected thereto in such a manner so as to prevent relative rotation only and is disposed opposite to the first clutch with a fine space $d_1$ formed therebetween, thus constituting a hydraulic actuator 66 for the first clutch $C_1$. On the other hand, an oil chamber 67 is defined by and between the piston portion 63 and the movable member 62 and the reverse surface of the piston portion 63 is disposed opposite to the second clutch $C_2$ with a space $d_2$ larger than the space defined therebetween $d_1$ ($d_1 < d_2$), thus constituting a hydraulic actuator 69 for the second clutch $C_2$. The hydraulic actuators 66 and 69 are so constituted in order that when oil pressure within the oil chamber 67 is discharged, it does not easily come off by centrifugal force. Due to the foregoing, the hydraulic actuators 66 and 69 are provided with a check valve so that the oil pressure is discharged at a predetermined pressure. Disposed between the piston member 63 and a ring fixed to the flange connecting boss portion 5b is a spring 70 biased in its contracted state. The spring 70 constitutes a return spring commonly used for the piston members 62 and 63 of both of the hydraulic actuators 66 and 69. The first clutch $C_1$ is interposed between the internal periphery of the outer diameter side of the flange portion 54 and the outer periphery of the ring gear $R_1$ of the single unit 2. The second clutch $C_2$ is interposed between the internal periphery of the movable member 62 and the flange portion 53b connected to the front end of the hollow shaft 53. The return spring 70 is disposed in a space formed between the piston member 63 and the flange portion 53b at the inner diameter side of the second clutch $C_2$.

On the other hand, the annexed transmission part $20_2$ includes a counter shaft 71 rotatably supported by the axle case 37. The shaft 71 is provided at its front end portion with a sub-transmission unit 22 comprising a single planetary gear unit 26 for an underdrive (U/D). Connected to and supported by the shaft 71 is a differential drive pinion 23. A counter driven gear 21 meshing with the counter drive gear 9 is rotatably supported on the hollow boss portion 23a of the pinion 23 through a bearing. The planetary gear unit 26 comprises a sun gear $S_3$, a carrier $CR_3$ supporting pinion $P_3$ and connected to the differential drive pinion 23, and a ring gear $R_3$ integrally connected to the counter driven gear 21. A boss member 76 formed with the sun gear $S_3$ is rotatably supported by the shaft 71. The boss member 76 is connected to a flange portion 76a. Interposed between the front end of the boss member 76 and the connecting member 37c connected to the axle case 37 is a fourth (U/D) one-way clutch $F_3$. The flange portion 76a is provided at its outer periphery with a fourth (U/D) brake $B_4$ comprising a band brake. Interposed between the internal periphery of the flange portion 76a and the carrier $CR_3$ of the gear unit 26 is a fourth (U/D direct) clutch $C_3$. The clutch $C_3$ is controlled by a hydraulic actuator 77 formed within the flange portion 76a. A collar side board 79 constituting the carrier $CR_3$ is provided at its inner side with a spring 80 for returning the actuator 77.

The differential portion 35 includes right and left front axles $81l$ and $81r$ rotatably supported by the axle case 37, a differential gear unit 82 and a ring gear mount case 83. The mount case 83 is fixed with a ring gear 85 meshed with the differential drive pinion 23, and at the same time is adapted to support a pinion 86 of the differential gear unit 82 to constitute a differential carrier. The right and left side gears $87l$ and $87r$ of the differential gear unit 82 mesh with the differential pinion 86 and are connected to the right and left front axles $81l$ and $81r$.

Next, operation of the aforementioned transmission $1_2$ will be described with reference to the schematic view shown in FIG. 4 and operation table shown in FIG. 5.

Engine torque is transmitted to the input shaft 5 of the three speed automatic transmission mechanism $10_1$ through the torque converter portion 31. At the transmission mechanism portion $10_1$, three forward speeds and one reverse speed are obtained due to actuation of the respective clutches $C_1$, and $C_2$, respective brakes $B_1$, $B_2$ and $B_3$ and respective one-way clutches $F_1$ and $F_2$ according to the operation table shown in FIG. 5. Shifted rotation is transmitted from the counter drive gear 9 to the counter driven gear 21 of the annexed transmission part $20_2$. The annexed transmission part $20_2$, is shiftable to direct and U/D states according to actuation of the clutch $C_3$, brake $B_4$ and one-way clutch $F_3$. Gear shift of the automatic transmission mechanism portion $10_1$ and annexed transmission part $20_2$ are combined, and in total, a four forward speeds (six speeds are obtainable through a maximum combination thereof) is obtainable. That are, when the automatic transmission mechanism portion $10_1$ is in first speed and second speed, and the annexed transmission part $20_2$ is in the U/D state, first speed and second speed are obtainable. Then, when the automatic transmission mechanism portion $10_1$ is in second speed, the annexed transmission part $20_2$ is shifted to direct state to the obtain third speed in total. And, in the foregoing state, the automatic transmission mechanism portion $10_1$ is shiftable to third speed to obtain fourth speed in total. The forward four speed rotation is transmitted from the differential drive pinion 23 to the ring gear 85 of the differential portion 35 and further to the right and left front axles 81$l$ and 81$r$ through the differential gear unit 82 to drive the front wheels.

Figure 6:
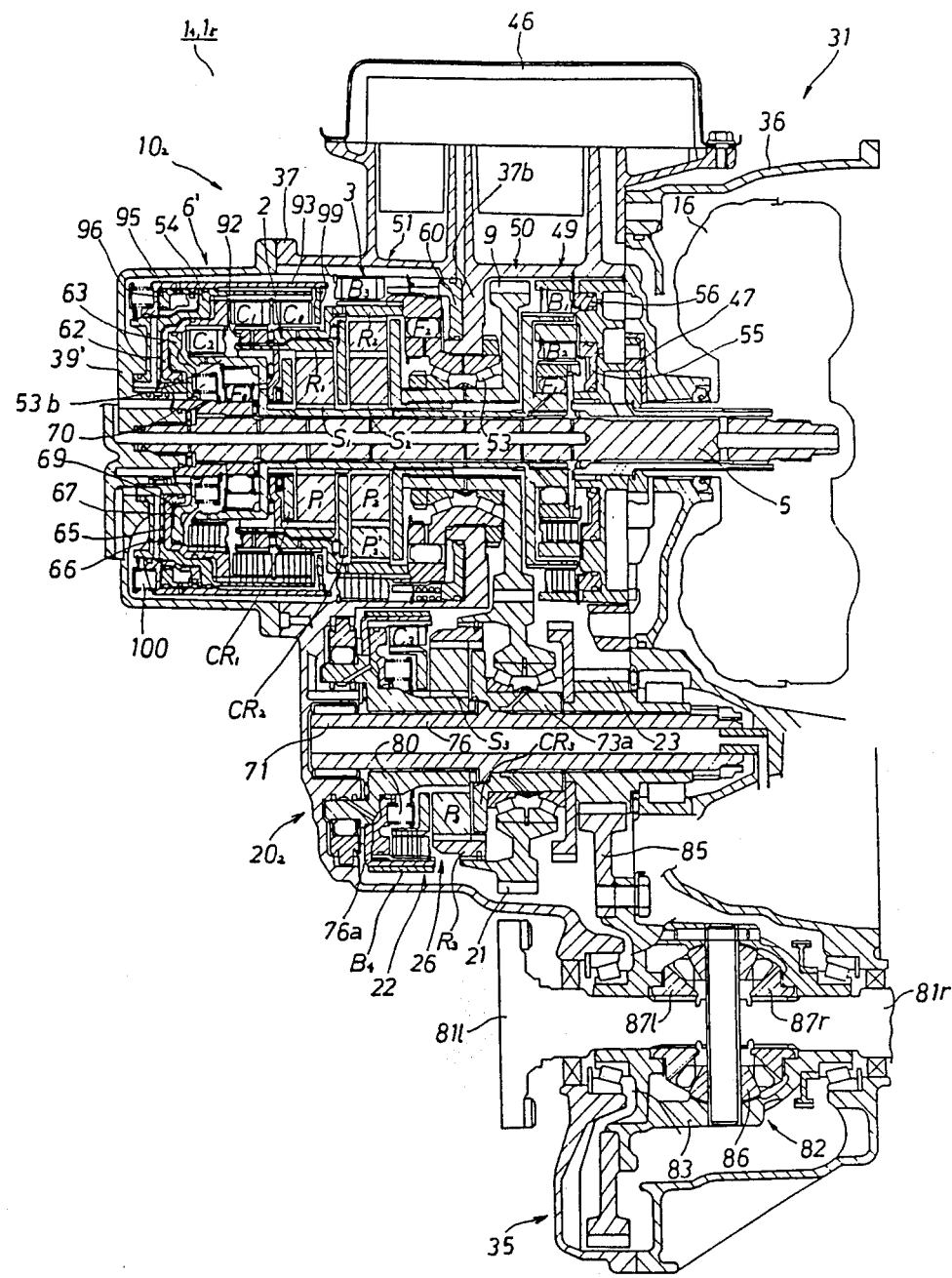
FIG. 6 is an overall sectional view showing one embodiment according to the present invention.

Next, another embodiment of the present invention will be described with reference to FIG. 6.

This embodiment is of the aforementioned three speed transmission mechanism attached with the third clutch $C_o$ and a third one-way clutch, and all portions are identical thereto excepting only the clutch portion. Accordingly, identical portions will be denoted by identical reference numerals, and description of the identical portions will be omitted.

An automatic transmission $1_4$ ($1_5$) includes a four speed automatic transmission mechanism portion $10_2$. The transmission mechanism portion $10_2$ includes a clutch portion 6' at its front end portion, i.e., the portion covered with a trans-axle cover 39'. The clutch portion 6' is provided with a first clutch $C_1$ and a third clutch $C_o$ disposed in parallel at an inner side in the axial direction. Disposed between a return spring 70 and a flange portion 53$b$ is a third one-way clutch $F_o$. Accordingly, since these third clutch $C_o$ and one-way clutch $F_o$ are located at different positions in the radial direction, the mechanism of this embodiment is longer than the three speed automatic transmission mechanism portion $10_1$ by a substantially wide length of the clutch $C_o$ in the axial direction. Although the constitution of the first clutch $C_1$, second clutch $C_2$, and hydraulic actuators 62 and 63 thereof is generally the same as that of the aforementioned three speed automatic transmission mechanism portion $10_1$, they are different in that a ring gear $R_1$ engaged with the first clutch $C_1$ is engaged through a connecting member 92 extending in the axial direction, a collar portion of a flange portion 53$b$ engaged with the second clutch $C_2$ and extending in the axial direction is long, and that a flange portion 54 connected to the front end of an input shaft 5 and extending in the axial direction is long. The flange portion 54 is provided at its outer periphery with a cylindrical movable member 93. The internal peripheral surface of one end of the movable member 93 is oiltight with a reaction member 95 engaged with the flange portion 54 and constitutes an actuator 96 for a third clutch $C_o$ comprising a double piston. The movable member 93 serves as an arm extending along the outer diameter side of the flange portion 54 and is provided at its front end with a tongue member 99 abuttable against the third clutch $C_o$ hanging down in the inner diameter direction and fixed thereto. Disposed between the other end of the movable member 93 and a ring fixed to the flange portion 5$a$ is a return spring 100 biased in its contracted state.

Figure 7:
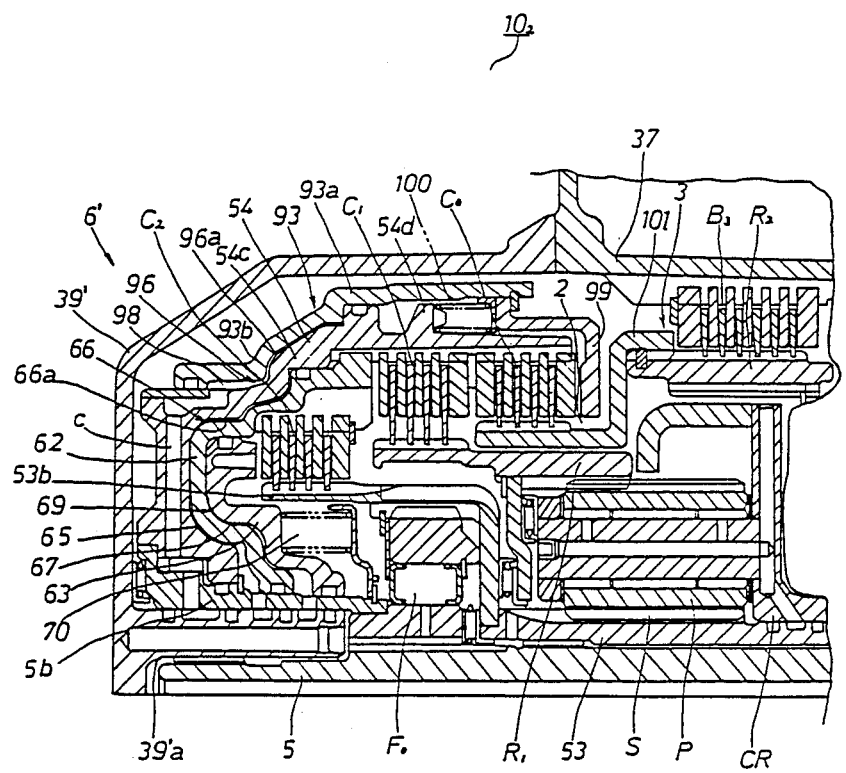
FIG. 7 is an enlarged sectional view showing a clutch portion of the transmission of FIG. 6.

A partly modified embodiment of the clutch portion 6' will be described in detail with reference to FIG. 7.

A hydraulic actuator 96 for a third clutch $C_o$ according to this embodiment includes a movable member 93 constituting a single piston comprising a single oil chamber 98. A piston portion 93$b$ of the movable member 93 is constituted along a cylinder 96$a$ formed by the outer peripheral surface of a flange portion 54. The front end portion of the movable member 93 serves as an arm 93$a$ extending along the outer diameter side of the flange portion 54, and a tongue 99 at its front end hangs down in the inner diameter direction. Disposed between a base portion of the tongue 99 and an annular projection portion 54 of the flange portion 54 is a return spring 100 biased in its contracted state. A ring gear $R_1$ of the single planetary gear unit 2 extends in the axial direction and is directly engaged with the first clutch $C_1$. An erected portion of the flange portion 54 has an oil path c extending therethrough for the actuator 96. Pressurized oil is fed to the actuator 96 from an annular collar portion 39'$a$ formed on a cover 39' through an oil path extending through a boss portion 5$b$. A ring gear $R_2$ of a dual planetary gear unit 3 is formed with a spline at its outer peripheral surface. The spline is engaged with a third brake $B_3$ and also with a connecting member 101 formed in the shape of a stepped cylinder. The spline formed on the outer periphery of the small diameter portion of the connecting member 101 is engaged with a third clutch $C_o$.

Figure 8:
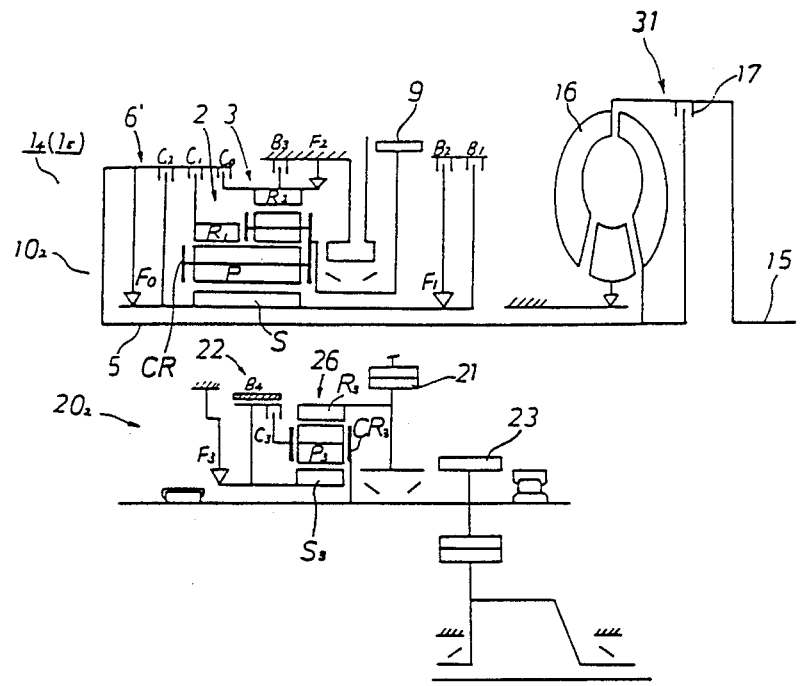
FIG. 8 is a schematic view thereof.
Figures 11, 12:
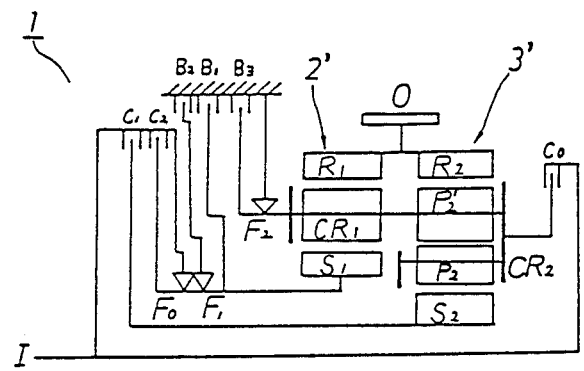
FIG. 11 is a schematic view showing a conventional Ravigneaux type transmission.
FIG. 12 is an illustration showing the actuating state of the respective elements thereof.

Next, operation of the above embodiment will be described with reference to the schematic view shown in FIG. 8 and an operation table shown in FIGS. 9 and 10.

Rotation of the input shaft 5 transmitted through the torque converter portion 31 enables four forward speeds and one reverse speed to be obtained by the four speed automatic transmission mechanism portion $10_2$ based on operation of the respective clutches $C_1$, $C_2$ and $C_3$, respective brakes $B_1$, $B_2$ and $B_3$, and respective one-way clutches $F_1$, $F_2$ and $F_o$ according to the operation table. Since operation at the time of R range, first speed and second speed in 2 range and D range is same as that of the three speed automatic transmission mechanism $10_1$ described above, description thereof will be omitted. That is, in the third speed state in D range, the third clutch $C_o$ is connected in addition to the connection of the first clutch $C_1$. Then, rotation of the input shaft 5 is transmitted to the ring gear $R_1$ of the single unit 2 through the clutch $C_1$ and also to the ring gear $R_2$ of the dual unit 3 through the clutch $C_o$. Accordingly, the respective elements of both the planetary gear units 2 and 3 are integrally rotated, and a rotational speed that is the same as that of the input shaft 5 is transmitted to a counter drive gear 9 from a carrier CR. At this time, the second brake $B_2$ maintains its retaining state until the clutch $C_o$ is connected in order to prevent it from temporarily returning to the first speed state from second speed. When the clutch $C_o$ is completely connected and the planetary units 12 and 13 are integrally rotated, the third one-way clutch $F_o$ is synchronously rotated. And, in the fourth speed state, the first clutch $C_1$ is disengaged and the first brake $B_1$ is actuated. Then, rotation of the input member 5 is transmitted to the ring gear $R_2$ of the dual unit 13 through the clutch $C_o$. Since the sun gear S is stopped in the foregoing state, the carrier CR is rotated at a high speed while causing the ring gear $R_1$ to rotate idly at an increased speed and the high speed rotation is taken off as an overdrive (O/D); of the counter drive gear 9. Shifted rotation of the counter drive gear 9 is shifted to direct and U/D at the annexed transmission portion $20_2$ based on the respective operations of the clutch $C_3$, brake $B_4$ and one-way clutch $F_3$ according to the operation table. And the respective gear shifting of the automatic transmission mechanism portion $10_2$ and the annexed transmission portion $20_2$ are combined to obtain five forward speeds ($1_4$) or six forward speeds ($1_5$) (eight speeds are obtainable through maximum combination) in the transmission as a whole. More particularly, a forward six speed automatic transmission $1_5$ is obtained as follows: a first speed in total is obtained through combination of first speed of the four speed automatic transmission mechanism portion $10_2$ and U/D of the annexed transmission part $20_2$, then a second speed in total is obtained by shifting the annexed transmission portion $20_2$ to the direct state while maintaining the mechanism portion $10_2$ in one speed, then, a third speed in total is obtained by shifting the mechanism portion $10_2$ to the second state and shifting the annexed transmission portion $20_2$ to U/D, then, a fourth speed in total is obtained by shifting only the annexed transmission portion $20_2$ to the direct state, and in the foregoing directly connected state, a fifth speed and a sixth speed in total are obtained by shifting the automatic transmission mechanism portion $10_2$ to third speed and fourth speed states respectively. A forward five speed automatic transmission $1_4$ is obtainable from the automatic transmission $1_5$ by canceling the two speed state wherein the automatic transmission mechanism portion $10_2$ assumes the first speed state and the annexed transmission portion $20_2$ is in the direct state.

Based on the foregoing embodiments, the effects of the respective description will be summarized as follow. If the first one-way clutch $F_1$, second one-way clutch $F_2$ and third one-way clutch $F_o$ are employed, all shifting can be performed through the one-way clutch, sufficient time is made available for operating the clutch and brake easily and surely, and a smooth shift is obtainable, since a possible shift shock due to change of grasping can be eliminated.

Furthermore, if the sun gear S of the single planetary gear unit 12 and the dual planetary gear unit 13 are commonly used, and a long pinion P is integrally formed by the carrier pinion $P_1$ of the single unit 12 and one of the carrier pinions $P_2$ of the dual planetary gear unit 13, machining performance and productivity can be improved, and the mechanism is much more compact.

Furthermore, if the first clutch $C_1$ is disposed at the outer diameter side of the ring gear $R_1$ of the single gear unit 2 and at the inner diameter side of the flange portion 54, the second clutch $C_2$ is disposed parallel to the ring gear $R_1$ in the axial direction, the third clutch $C_o$ is disposed parallel to the clutch $C_1$ at its inner side in the axial direction, and the third one-way clutch $F_o$ is disposed at the inner diameter side of the second clutch $C_2$, wasteful space can be eliminated. Thus, the mechanism is much more compact.

Furthermore, since the first clutch $C_o$, second clutch $C_2$ and third clutch $C_o$, and hydraulic actuators 66, 69 and 96 for the actuation thereof are disposed together at the front end portion of the automatic transmission mechanism $10_2$, the three speed automatic transmission mechanism $10_1$ can be modified to a four speed automatic transmission mechanism $10_2$ by slightly modifying the clutch portion 6'. Due to the foregoing, a plurality of automatic transmissions can be assembled by the use of common parts and a common assembly line, thus enabling many kinds, wide variations, etc. of vehicles to be produced without increasing the amount assembling instruments required ior the manufacturing costs.

Furthermore, since the third clutch $C_o$ is disposed at the inner side portion in the axial direction and the hydraulic actuator 96 is disposed at the front end portion thereof, with the flange portion 54 constituting a part of the hydraulic actuator (cylinder) 66a and functioning as a connecting member for connecting the input member 5 to the respective clutches $C_1$ and $C_2$ sandwiched therebetween, and the clutch $C_o$ and actuator 96 are connected with respect to each other by the arm 93a extending along the outer diameter of the flange portion 54, it can be made compact. Particularly, the length of the automatic transmission is short in the axial direction.

Furthermore, if the flange portion 54 includes a stepped collar portion 54c, the inner diameter side thereof forms the cylinder 66 of the hydraulic actuator 66 and the outer diameter side thereof forms the cylinder 96a of the hydraulic actuator 96 for actuating the third clutch $C_o$, the clutches $C_1$ and $C_2$ and the hydraulic actuators 66 and 69 can be assembled and disassembled easily. Thus, assembling performance and maintenance is improved. In addition, such a structure is compact.

Although the present invention has been described with reference to preferred embodiments, the embodiments described herein are for illustrative purposes only and not in limitation thereof. Also, the scope of the present invention is defined in the appended claims and will not be bound by description of the embodiments. Accordingly, it will be understood that all changes and modifications which belong to the appended claims fall within the true spirit and scope of the present invention.

What is claimed is:

1. An automatic transmission mechanism comprising:
   a single planetary gear unit;
   a dual planetary gear unit;
   carriers of both of the planetary gear units that are connected to one another;
   sun gears of both of the planetary gear units that are connected to one another;
   an output member to which the carriers are connected;
   an input member connected to a ring gear of the single planetary gear unit through a first clutch means, to the sun gears through a second clutch means, and to a ring gear of the dual planetary gear unit through a third clutch means; and
   brake means for braking rotation of the sun gears, and the ring gear of said dual planetary gear unit.

2. An automatic transmission mechanism as claimed in claim 1,
   wherein the brake means comprises a first brake for directly braking rotation of the sun gears, a second brake and a one-way clutch for restricting rotation of the sun gears to unidirectional rotation, a third brake for directly braking the ring gear of the dual planetary gear unit, a first one-way brake for restricting rotation of the ring gear of the dual planetary gear unit to undirectional rotation, a second one-way clutch operatively connected between the input member and the sun gears for limiting the rotational speed of the sun gears such that rotational speed of the sun gears does not exceed a rotational speed of the input member.

3. An automatic transmission mechanism as claimed in claim 1,
   wherein the sun gears of both of the planetary gear units are integral with one another; and further comprising
   a carrier pinion of the single planetary gear unit integral with a carrier pinion of the dual planetary gear.

4. An automatic transmission as claimed in claim 2, wherein the first clutch means is adjacent the ring gear of the single planetary gear unit at the outer diameter thereof;

the second clutch means is parallel to the ring gear of the single planetary gear unit and is spaced therefrom in an axial direction that extends along an axis of the transmission mechanism, the third clutch means is parallel to the first clutch means and is disposed at a side thereof opposite from the second clutch means; and the second one-way clutch is disposed adjacent an inner diameter of the second clutch means.

5. An automatic transmission comprising:

a single planetary gear unit;

a dual planetary gear unit;

carriers of both of said planetary gear units that are connected together;

sun gears of both of the planetary gear units that are connected together;

an output member to which the carriers are connected;

an input member connected to a ring gear of the single planetary gear unit through a first clutch, to the sun gears through a second clutch, and to a ring gear of the dual planetary gear unit through a third clutch;

a hydraulic actuator for actuating the first, the second and the third clutches, the clutches and the hydraulic actuator being disposed at an end portion of the hydraulic transmission mechanism, the third clutch being disposed inwards in an axial direction extending along an axis of the transmission mechanism from the first and the second clutches, the hydraulic actuator having a flange portion for operatively connecting the input member to the respective clutches; and an arm extending from the flange portion along an outer diameter side thereof for operatively connecting the third clutch to the hydraulic actuator.

6. An automatic transmission mechanism as claimed in claim 5, wherein the flange portion includes a stepped collar having an inner diameter side and an outer diameter side; and the inner diameter side comprising a cylinder of the hydraulic actuator for actuating the first clutch, and the outer diameter side comprising another cylinder of the hydraulic actuator for actuating the third clutch.

7. An automatic transmission mechanism comprising:

a single planetary gear unit;

a dual planetary gear unit;

carriers of both of the planetary gear units that are connected to one another;

sun gears of both of the planetary gear units that are connected to one another;

an output member to which the carriers are connected;

an input member connected to a ring gear of the single planetary gear unit through a first clutch, to the sun gears through a second clutch, and to a ring gear of the dual planetary gear unit through a third clutch;

brake means for braking rotation of the sun gears, and the ring gear of the dual planetary gear unit;

a hydraulic actuator for actuating the first, the second and the third clutches, the clutches and the hydraulic actuator being disposed at an end portion of the hydraulic automatic transmission mechanism;

the hydraulic actuator having a flange portion, the flange portion comprising a cylinder of the hydraulic actuator for actuating the first clutch, another cylinder of the hydraulic actuator for actuating the third clutch, and a connecting member for connecting the input member to the respective clutches, the flange portion having a non-rotatable movable member for moving in an axial direction that extends along an axis of the automatic transmission mechanism, the movable member comprising a piston of the hydraulic actuator for actuating the first clutch, and a cylinder of the hydraulic actuator operatively connected to the second clutch for actuating the second clutch, the movable member having a piston member that is movable in the axial direction, the piston member comprising a piston of the hydraulic actuator for actuating the second clutch; and a return spring for biasing the piston member, the return spring biasing the hydraulic actuator for actuating the first and the second clutches to a return position.

* * * * *